UNITED STATES PATENT OFFICE.

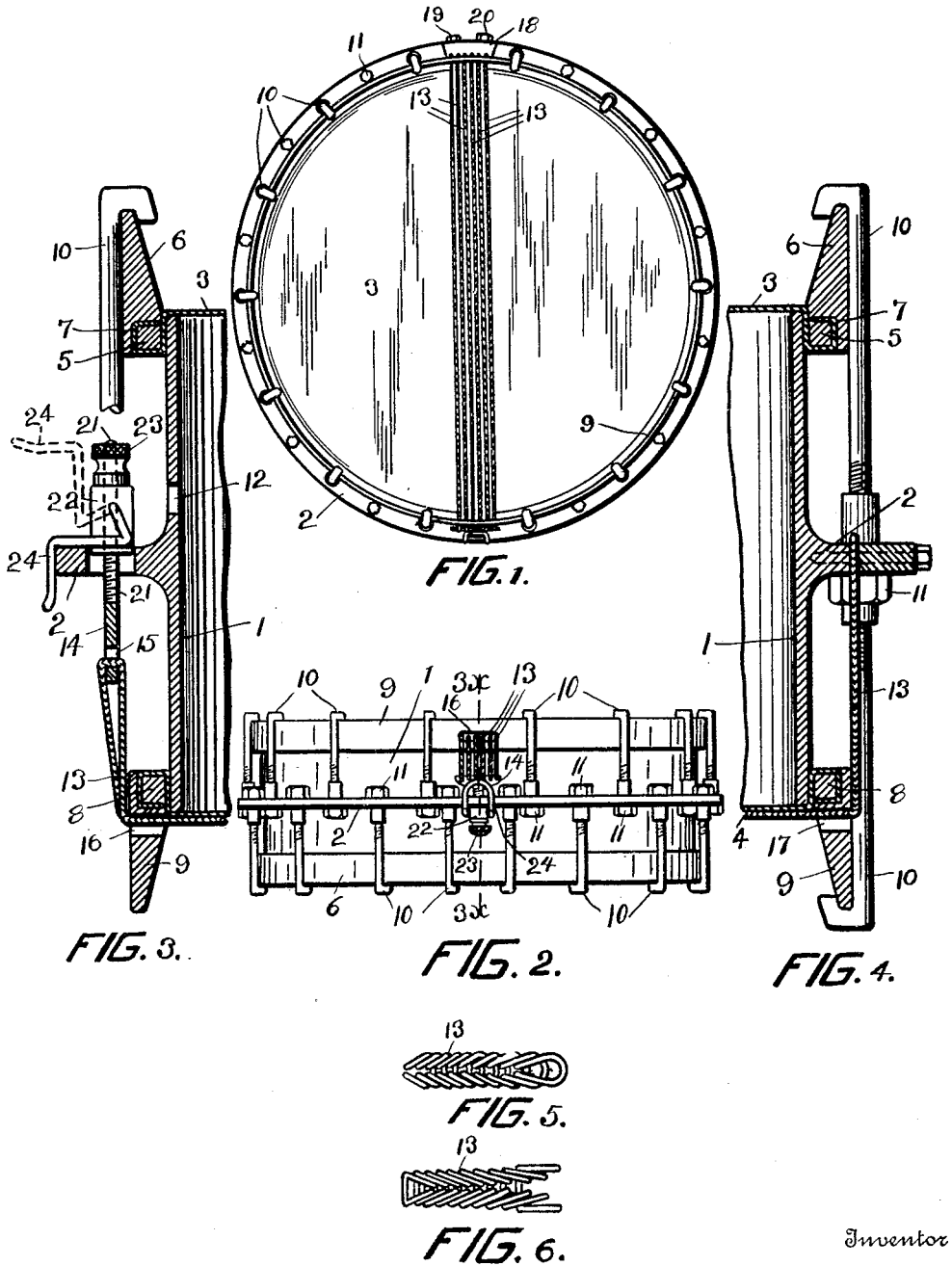

GEORGE M. CARNES, OF ROCHESTER, NEW YORK.

DRUM.

1,127,589.  Specification of Letters Patent.  Patented Feb. 9, 1915.

Application filed November 10, 1913. Serial No. 800,215.

*To all whom it may concern:*

Be it known that I, GEORGE M. CARNES, a citizen of the United States, residing at Rochester, in the county of Monroe and State of New York, have invented certain new and useful Improvements in Drums, of which the following is a specification.

The object of this invention is to provide a new and efficient drum.

Another object of the invention is to construct the shell of a drum in such a manner as to increase its strength and rigidity without materially increasing its weight thereof.

Another object of the invention is to provide an improved device for putting the drum heads in tension.

Another object of the invention is to provide an improved form of muffler for drawing the snares into contact with the drum-head or releasing them from contact therewith.

Another object of the invention is to equip the drum with an improved form of snares that improves the quality and volume of the noise made by the drum when the snare is in contact with the drum-head, and which form of snare is more easily released from the drum-head when it is desired to make it inoperative.

These and other objects of the invention will be illustrated in the drawings, described in the specification and pointed out in the claims at the end thereof.

In the accompanying drawings Figure 1 is a bottom plan view of the drum. Fig. 2 is a side elevation of the drum inverted. Fig. 3 is an enlarged sectional elevation on the line $3^x$—$3^x$ of Fig. 2. Fig. 4 is a vertical section through the drum on the side opposite to Fig. 3. Figs. 5 and 6 are enlarged detail views of a portion of the snare.

In the accompanying drawings like reference numerals indicate like parts.

In the drawings 1 indicates the shell of the drum, which shell is cylindrical in form and has the stiffening rib or flange 2 extending around on the outside thereof. At the top of the drum is placed the head 3 and at the bottom of the drum is placed the head 4, both of which are preferably of calf or llama skins. The edge of the top head is wrapped around the hoop 5 which extends around the top of the shell on the outside thereof. This hoop is engaged by and held in place by a band 6, which band has an angular recess 7 at the bottom therein, in which is engaged the hoop 5 and the edge of the drum-head which is wrapped around the hoop. A similar hoop 8 and band 9 is placed at the bottom of the drum for the purpose of holding the drum head 4. The flange 2 is perforated at suitable intervals and through these perforations extend the hooks 10, which extend both ways from the flange and engage the top and bottom bands. These hooks are threaded and are engaged by nuts 11, each of which nuts has a long threaded sleeve thereon, which extends through the flange 2 and engages with the threaded end of the hook. By turning these nuts the hooks are drawn down or up as the case may be causing the movement of the ring for the purpose of drawing the drum-head tight over the shell. The shell 1 is provided with an air hole 12 through which air may pass freely into and out of the drum.

Stretched across the bottom of the drum are the snares 13, which snares are held in place at the ends thereof as follows: Six snares are shown in Fig. 1, but any number can be used. Ordinarily ten or a dozen are used, the number preferably being in each case an even number. In Fig. 3 is shown the muffling device having a plate 14 therein, which plate is perforated at 15 through which perforations the snares 13 are passed. The snares are passed under the drum through openings 16 and 17 in the ring 9 and out to a suitable recess in the flange 2. At this point the flange 2 is cut away and the segmental block 18 is provided therein, which block is fastened in place by the screws 19 and 20. Between this block and the flange 2 on the shell of the drum is clamped the free ends of the snares. It will be noticed of course, that the snares may consist of a continuous chain that runs back and forth under the drum, passing through the plate 14 on the one side and doubling back under the block 18 on the other side, the loose ends of it being clamped with the block 18.

The plate 14 has a stem 21 thereon which passes up through a suitable opening in the flange 2 through the sleeve 22, on the top of which is placed a nut 23. This sleeve 22 is preferably rectangular in cross section and the hole through the flange of the drum is shaped to receive the sleeve so that the sleeve can have an endwise movement in the hole. In the sleeve 22 is pivotally mounted a lever or cam 24 which may be moved to the full line position shown in Fig. 3, in which position the snares will be drawn tight against the lower head of the drum. By throwing the cam 24 up to the dotted line position the sleeve can drop down through the flange releasing the snares which will then be loose, and will hang down out of contact with the bottom head of the drum. By adjusting the nut 23 the snares may be drawn in any desired tension and a great variety of tones may be secured from the drum when this adjustment is used in connection with the cam 24.

In Figs. 5 and 6 I have illustrated in large views the particular type of chain that is used as the snares of the drum. This chain is what is known commercially as the fox-tail chain and is composed of links of wire of uniform shape that are closely woven together allowing great flexibility in the bending of the chain. The chain itself is substantially square in cross section, the top and the bottom of the chain having the appearance in Fig. 5 and the side of the chain having the appearance shown in Fig. 6. The peculiarity of this chain being that the free ends of each link is threaded through a loop or yoke of the second link from it, and are then bent back on the other side, sufficient clearance being given between the links to permit easy bending of the chain, the chain normally bending a circle having a diameter of a half inch or less.

I claim:

1. A drum having a snare extending diametrically across one of its heads, said snare consisting of a plurality of small chains made up of metallic links.

2. A drum having a snare extending diametrically across one of its heads, said snare being made up of a plurality of strips of fox-tail chain.

3. In a drum, the combination of a drum body having a rigid peripheral flange around its intermediate portion, drum heads for said body, means for adjusting the drum heads relatively to the body, a snare extending diametrically over one of said heads, said snare having one end secured to said body, a threaded stem engaging the opposite end of said snare and supported on said flange, and a cam carried by the stem and having a portion to fulcrum on said flange whereby the snare may be adjusted relatively to the drum body.

4. In a drum, the combination of a drum body having a flange integral therewith and extending around an intermediate portion, drum heads for said body, means for adjusting the drum heads relatively to the body, a snare extending diametrically over one of said heads, said snare having one end secured to said body, a threaded stem engaging the opposite end of said snare and supported on said flange, and a cam carried by the stem and having a portion to fulcrum on said flange whereby the snare may be adjusted relatively to the drum body.

5. In a drum the combination of a drum body, drum heads mounted on the drum body, means for adjusting the said drum heads relatively to the drum body, a flange integrally formed on the drum body, a sleeve mounted to slide through said flange, said sleeve having an opening therein, a plate for holding the ends of the snares, a threaded stud on said plate extending through said sleeve, a thumb nut engaging with said stud and adapted on its rotation to draw said stud up through said sleeve, a cam pivotally mounted on said sleeve and bearing against the flange by the movement of which the sleeve is raised and lowered on the flange.

6. In a drum the combination of a drum body provided with drum heads, a snare extending diametrically over one of the drum heads, a flange integrally formed on the drum body and means mounted on the said flange and engaging the said snare for adjusting the snare relatively to the said drum head, said means comprising a threaded stud secured to one end of the snare and extending through said flange, a sleeve on said stud, and a lever pivotally mounted on the sleeve and having an intermediate portion to fulcrum on said flange, said snare having its opposite end fixedly secured.

7. In a drum the combination of a drum body provided with drum heads, a flange integrally formed on the said drum body, a snare extending diametrically over one of the said drum heads, a sleeve slidably mounted in said flange and a cam pivoted on said sleeve having an intermediate portion to fulcrum on said flange for moving the sleeve relatively to said flange, and means for connecting said snares to said sleeve, said last named means being adjustable relative to said sleeve.

In testimony whereof I affix my signature in presence of two witnesses.

GEORGE M. CARNES.

Witnesses:
ALICE M. JOHANNS,
ERIC ISCHINGER.